United States Patent [19]

Tash

[11] Patent Number: 4,660,603
[45] Date of Patent: Apr. 28, 1987

[54] DRAIN PIPE PLUG DEVICE

[76] Inventor: George Tash, 18658 Chase St., Northridge, Calif. 91324

[21] Appl. No.: 855,717

[22] Filed: Apr. 25, 1986

[51] Int. Cl.$^4$ ............................................. F16L 55/12
[52] U.S. Cl. ........................................ 138/92; 138/93
[58] Field of Search ............... 134/166 C; 138/90, 92, 138/93

[56] References Cited

U.S. PATENT DOCUMENTS

| | | | |
|---|---|---|---|
| 1,180,282 | 4/1916 | Bunn | 138/90 |
| 2,279,257 | 4/1942 | Svirsky | 138/90 X |
| 3,431,945 | 3/1969 | Robillard | 138/90 |
| 4,460,019 | 7/1984 | Condon | 138/90 |

Primary Examiner—Stephen Marcus
Assistant Examiner—Mark Thronson
Attorney, Agent, or Firm—John J. Posta, Jr.

[57] ABSTRACT

The drain pipe plug device for drain testing includes an elongated elastomeric, flexible, resilient hollow tube which has a central passageway running its length and in communication with a rear portion bearing an inlet and front portion bearing an outlet. These two portions are joined to a narrow diameter more flexible middle portion. The inlet is fitted with a connector adapted to receive water and air hoses. The outlet is fitted with a pressure relief valve, preferably in the form of an open cage bearing a fluid-blocking transverse plate trapped in a transverse internal groove. The plate is by-passed by fluid when the front portion expands sufficiently radially under pressure. The front tube portion has thicker walls than the rear tube portion and collapses first after both have radially expanded under fluid pressure so as to prevent backflow of fluid. The middle portion also expands radially and is flexible enough to facilitate passage of the device into intersecting drain pipes. The front portion is tapered and both front and rear portions are externally ribbed to facilitate sliding the device through drain pipes. The device is durable, efficient and safe.

17 Claims, 8 Drawing Figures

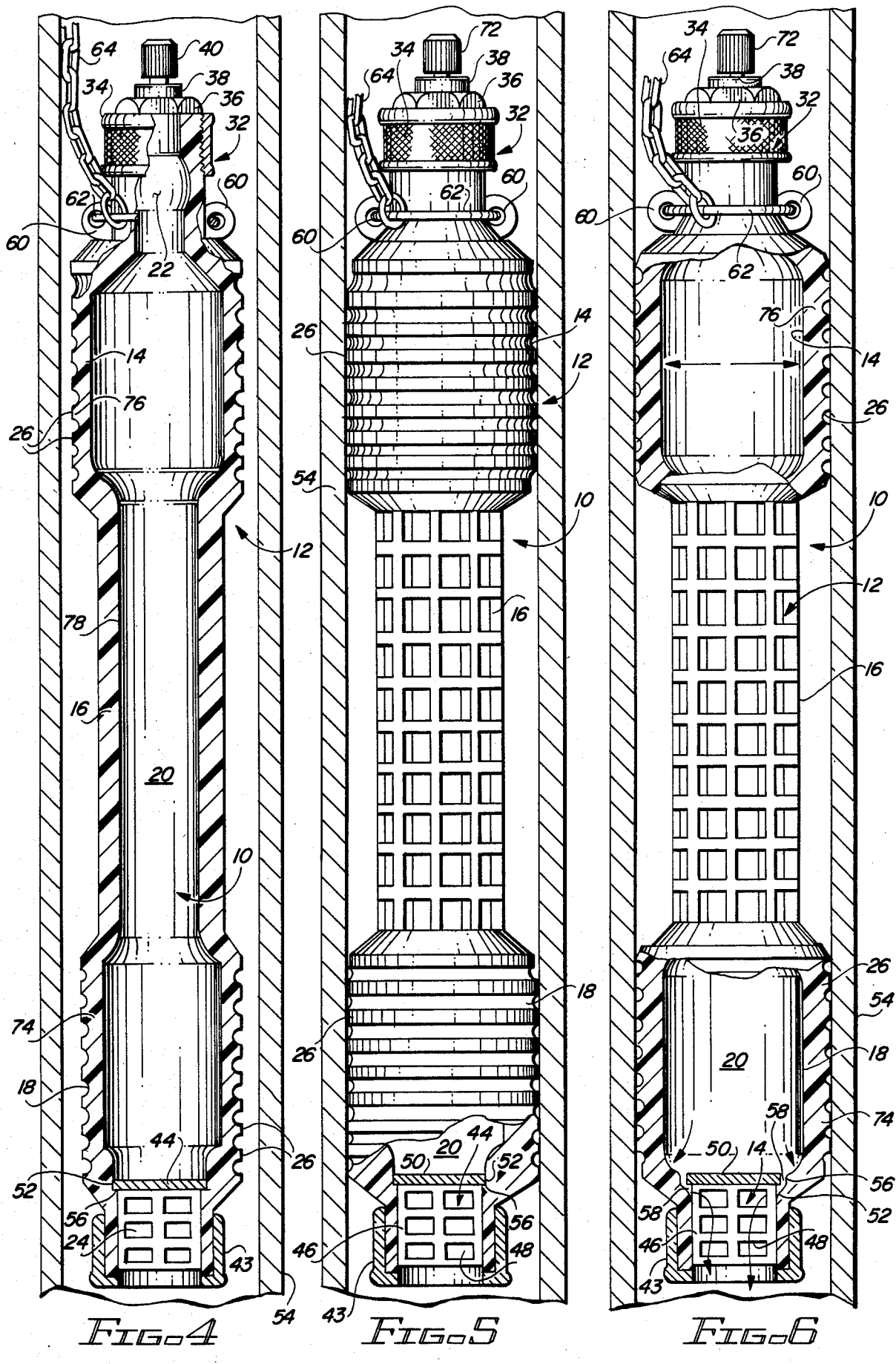

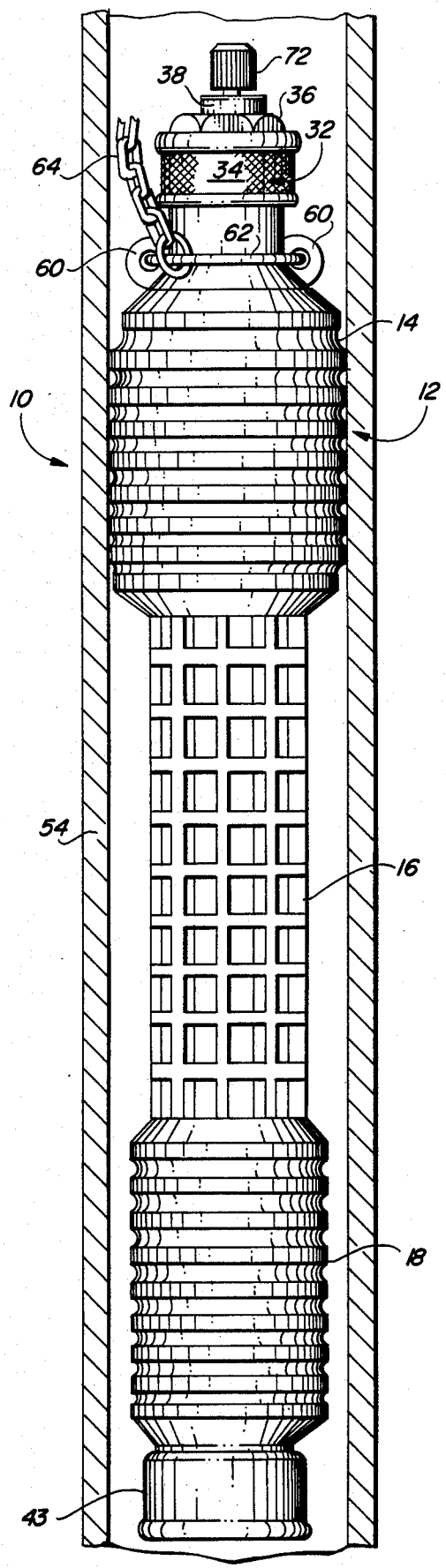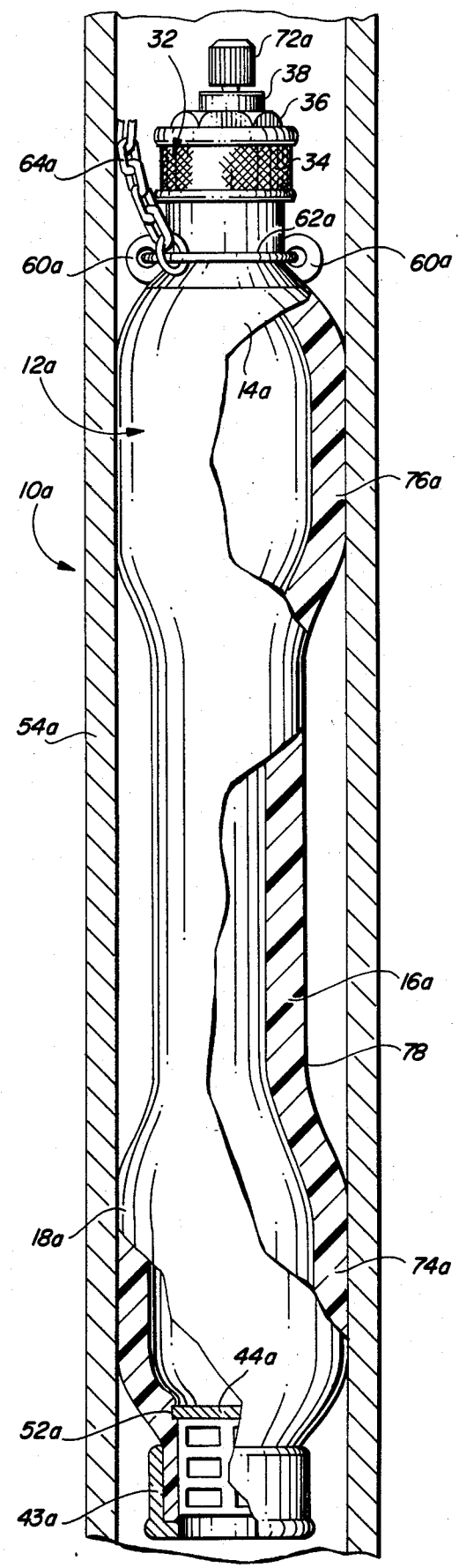

DRAIN PIPE PLUG DEVICE

BACKGROUND OF THE INVENTION

1. Field of the Invention

The present invention generally relates to plumbing devices and, more particularly, to an improved device for temporarily plugging drain pipes in order to test the same.

2. Prior Art

When a new home, condominium or apartment house or the like is constructed, the drains must be tested for leaks before they can be approved by an inspector. This is usually accomplished by first inserting a temporary plug device through the clean-out pipe located outside the structure to a point where it intersects a sewer line running from the structure drain to the main sewer line. Such plug device usually is an elongated hollow expansible sausage-like unit which has a nipple at one end through which air is introduced into the unit until the unit expands sufficiently so that one end blocks the clean-out pipe while the other end of the device seals off the sewer line. Water can then be introduced into the entire house drain and sewer system to check for leaks.

Such a conventional plug device has several drawbacks. Thus, the device is usually difficult to slide into place and to retrieve due to its shape. Moreover, when the device is deflated, the fluid from the house drains not only flows into the sewer line but also backs up through the clean-out pipe, especially in multi-story structures, creating a sanitation hazard. Moreover, the device usually is adapted for use only with one diameter of pipes, necessitating various different sizes of the device to use in various plumbing systems. In addition, if the device is subjected to excess pressure during use, it will rupture, with possible serious injury to workmen and the plumbing and sewage system.

Accordingly, there is a need for an improved type of drain pipe plug device which can be inflated with either a liquid or a gas, and is safe to use. Such device should be easy to insert and retrieve, should not rupture even when subjected to excess inflation pressure, and should be adaptable to various drain pipe diameters. Of more importance, the device should prevent, upon its deflation after the drain test is run, back-flow of fluid from the house drains into the clean-out pipe.

SUMMARY OF THE INVENTION

The improved drain pipe plug device of the present invention satisfies all the foregoing needs. The device is substantially as set forth in the Abstract. Thus, the device comprises an elongated, generally tubular, hollow radially expandible, flexible, resilient member of rubber or the like having a front outlet portion, a rear inlet portion and a particularly flexible middle portion of reduced diameter. A central passageway extends the length of the device and terminates in a rear inlet to which a connector is secured, and a tapered front outlet in which a pressure relief valve is disposed.

The connector is adapted to receive a gas pressure hose and a water hose, as desired. The sidewall of the outlet portion is thicker than that of the inlet portion. Therefore, when the device is installed with its inlet portion in the clean-out pipe, its middle portion bent around the clean-out pipe-sewer line intersection and its outlet portion in the sewer line, its outlet portion collapses first during deflation of the device from its expanded blocking state, assuring that fluid from the house drain passes out the sewer line, not back up the clean-out pipe.

The devices tapered front portion and ribbed exterior facilitate ease of insertion of the device into drain lines and removal therefrom. Moreover, the pressure relief valve prevents blow-out of the device with consequent injury to plumbing, sewage lines, adjacent structural components and personnel. The pressure relief valve operates to automatically open the internal passageway in which it is seated when the internal pressure in the device rises to a point which causes the sidewall of the front portion to expand radially away from the relief valves block plate.

The device is inexpensive, simple, durable, efficient and safe to use. Other advantages of the device are set forth in the following detailed description and accompanying drawings.

DRAWINGS

FIG. 4 is a schematic side elevation, partly in section and partly broken away, of the device of FIG. 1 in the unexpanded condition in a drain or a sewer pipe;

FIG. 5 is a schematic side elevation, partly in section and partly broken away, of the device of FIG. 4 fully expanded so as to seal the pipe in which it is disposed;

FIG. 6 is a schematic side elevation, partly broken away, showing the device of FIG. 4 under sufficient pressure to cause the pressure relief valve thereof to operate to allow reduction of excess pressure and flow of fluid around the valve plate and out of the device;

FIG. 7. is a schematic side elevation of the device of FIG. 4 during deflation, with the outlet portion thereof collapsing first, thus allowing passage of fluid therearound while the inlet portion thereof still seals the pipe it is in; and, FIG. 8 is a schematic side elevation, partly broken away, and partly in section, of a second preferred embodiment of the improved drain pipe plug device of the present invention, with the device shown in a fully expanded sealing condition in a pipe.

DETAILED DESCRIPTION

FIGS. 1–7.

Figure 1:
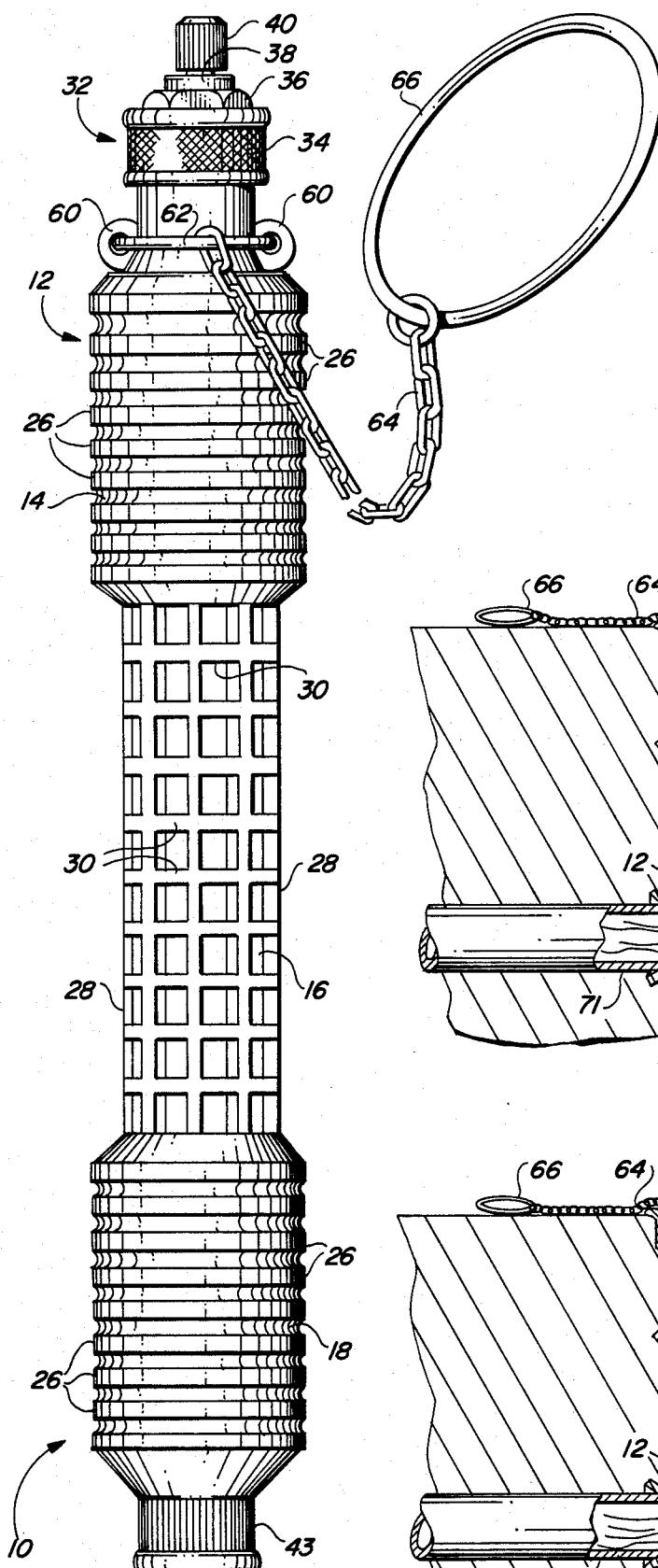
FIG. 1 is a schematic side elevation of a first preferred embodiment of the improved drain plug device of the present invention, showing the device in the resting unexpanded condition.

Now referring more particularly to FIGS. 1 thru 7 of the drawings, a first preferred embodiment of the improved drain plug device of the invention is schematically depicted therein. Thus, device 10 is shown which, as shown in FIGS. 1 and 4, comprises an elongated, hollow, tubular, generally cylindrical, resilient, flexible member 12 fabricated of elastomeric material such as natural or synthetic rubber, plastic or the like. Member 12 is capable of expanding radially under internal fluid pressure to block a drain pipe, sewer line or the like.

Member 12 has an inlet portion 14 integrally connected to an elongated very flexible middle portion 16, in turn integrally connected to an outlet portion 18 to form a unitary structure. Middle portion 16 is of reduced external diameter with respect to portions 14 and 18. An internal central fluid passageway 20 is disposed throughout the length of member 12 terminating in a narrow inlet 22 and a narrow outlet 24. It will be noted that portions 14 and 18 have a plurality of spaced, transverse, integral external reinforcing ribs 26, while portion 16 has a plurality of spaced external reinforcing ribs 28 running longitudinally and interconnecting spaced, transverse reinforcing ribs 30. Ribs 26, 28 and 30 reduce frictional contact of member 12 with the walls of pipes through which they must pass to be placed in a proper blocking location.

Device 10 also includes a dual connector 32 secured to inlet 22 and comprising a water hose connector ring 34 in which is releasably screwed a plug 36 bearing a gas hose fitting 38 and removable cap 40. Accordingly, member 12 is adapted to receive a gas such as air under pressure through fitting 38 into passageway 20, or, when plug 36 is removed, a liquid such as water under pressure through ring 34 into passageway 20, all for the purpose of radially expanding portions 14 and 18 to block, respectively, the clean-out pipe and sewer line leading from a house, in order to test the houses plumbing.

It is necessary that member 12 be able to hold pressure in passageway 20. Therefore, it is fitted in outlet 24 with a pressure relief valve 42 which normally blocks passageway 20 (FIGS. 4 and 5) and an external fitting 43 which restricts the expansion of outlet 24. Thus, valve 42 comprises an open tubular cage 44 having spaced interconnected transverse ribs 46 and longitudinal ribs 48 and an imperforate transverse blocking plate 50. Cage 44 can be formed of metal, ceramic, hardened rubber, plastic or the like. Plate 50 is normally located adjacent the rear end of cage 44 in a transverse groove 52 in the narrow outlet 24 of portion 18 to completely block passage of pressurized fluid out of outlet 24, even when portion 18 is radially expanded sufficiently to block pipe 54 (FIG. 5).

However, when member 12 is over pressurized (FIG. 6), the part 56 of portion 18 defining groove 52 is forced radially outwardly from the outer periphery of plate 50 sufficiently to open a fluid by-pass space 58 therebetween through which excess pressurized fluid by-passes plate 50 and passes through cage 44 and out of member 12 until part 56 is allowed to collapse or flex back against plate 50 to close space 58. Cage 44 during the by-passing may move back slightly as shown in FIG. 6, or remain stationary, depending on the particular configuration of part 56. Thus, valve 42 functions to protect member 12 against over pressurization and blow-out, with consequent injury to piping surrounding building components and personnel.

Device 10 may further include a pair of ears 60 receiving a transverse ring 62 (FIG. 1) in portion 14 to which may be connected one end of a chain 64, the other end of which may be connected to a pull ring 66 to prevent loss of member 12 down a sewer line while member 12 is in the uninflated state and to enable member 12 to be easily drawn from such line.

Figure 2:
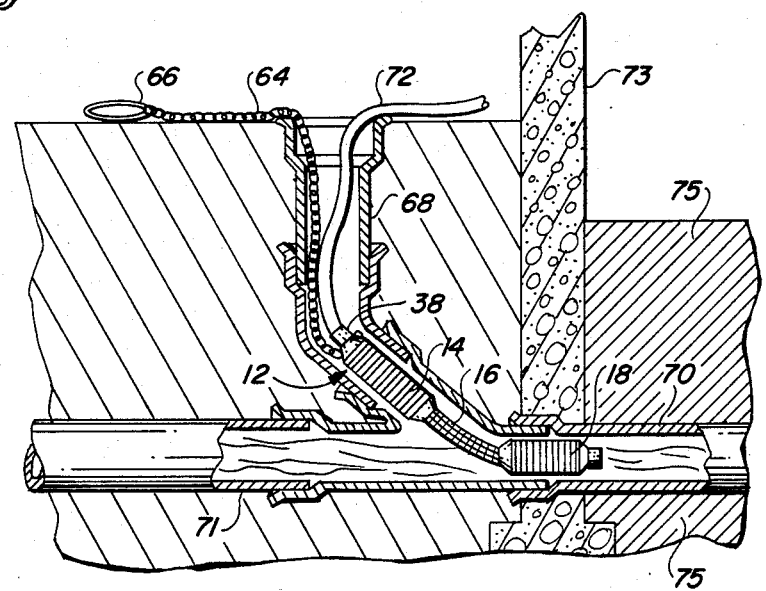
FIG. 2 shows the device of FIG. 1 inserted in the unexpanded condition through a clean-out pipe and into a sewer line.

It will be noted that member 12 is self-supporting, even in the uninflated state. Thus, it can be easily slid down a clean-out pipe 68 (FIG. 2) and around the angled junction of pipe 68 with sewer line 70 which is also joined to and runs from house drain 72 under a foundation 73 and out to a sewer main (not shown) below ground 75. Member 12 is first passed into the desired blocking position with portion 18 in line 70 and portion 14 in pipe 68, while member 12 is in the unexpanded state. Portion 16 easily flexes around the indicated junction. In FIG. 2, member 12 is shown connected through fitting 38 to a pressurized gas line 72, so that when gas is introduced therethrough to inflate member 12 (FIG. 3) portions 14, 16 and 18 all expand radially, portions 14 and 18 expanding sufficiently to block, respectively, clean-out pipe 68 and sewer line 70 to allow the previously described test to be run by introducing water into the home sewer and checking for leaks. FIG. 4 shows the unexpanded state of member 12. FIG. 5 shows the expanded full blocking state of member 12, such as that also illustrated in FIG. 3, while FIG. 6 shows the over-expanded state which causes valve 42 to operate as previously described. FIG. 7 illustrates another important feature of device 10. Thus, it will be noted from FIGS. 4 and 6 that the thickness of the sidewall 74 of portion 18 is greater than that of the sidewall 76 of portion 14. For example, tubular member 12 may be about 19 or 20 inches in length, exclusive of connector 32, with an overall length of about 20.75 inches, portion 16 being about 8 inches long and 1.7 inches in diameter, portion 14 being about 6.75 inches long and 2.3 inches in diameter, portion 18 being about 6.25 inches long and about 2.3 inches in diameter. Other sizes are also suitable.

The thickness of sidewall 76 between ribs 26 may be, for example, about 0.175 inch, while that of sidewall 74 between ribs 26 may be, for example, about 0.250 inch. Generally, the thickness of sidewall 76 will be about 50–80% that of sidewall 74. Ribs 26 may be, for example, about 0.150 inch in uniform thickness in both portions 14 and portion 18. The thickness of sidewall 78 of portion 16 may be, for example, similar to or identical to that of sidewall 74. Ribs 28 and 30 thereof may be, for example, about 0.10 inch in thickness.

Figure 3:
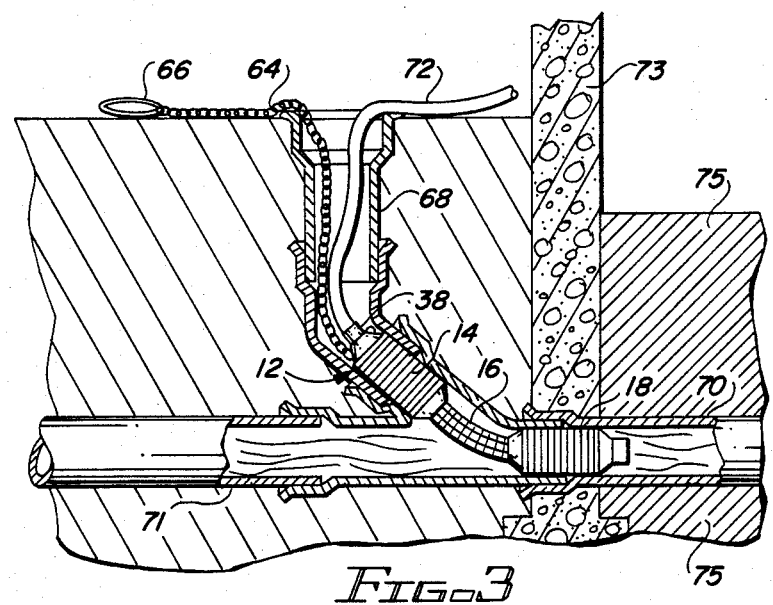
FIG. 3 shows the device of FIG. 1 in the expanded condition in the clean-out pipe and sewer line, and blocking flow of fluid through the clean-out pipe and sewer line.

Thus, when at the end of the test, pressure is relieved through line 72, as shown in FIG. 7, to deflate member 12 from the state shown in FIG. 3, due to its greater sidewall thickness, portion 18 collapses before portion 14. This allows water to instantly pass around it and out sewer line 70 while clean-out pipe 68 remains blocked by portion 14. Thus, water cannot back up clean-out pipe 68. Water clears the area very rapidly, so that portion 14 can also deflate fairly rapidly to allow member 12 to be pulled out of clean-out pipe 68 by ring 66 and chain 64.

It will be understood that device 10 can be of any suitable length and diameter and of any suitable radial expansibility. In one embodiment, member 12 is sized so that portions 14 and 18 can simultaneously block three inch and four inch diameter pipes. Thus, device 10 is simple, efficient and durable. It is inexpensive and easy to install and remove and is adaptable to a variety of situations. Moreover, it will be noted that portion 18 is tapered down toward outlet 24, allowing for easier passage of member 12 through drain pipes for faster, smoother use.

FIG. 8.

A second preferred embodiment of the improved drain pipe plug device of the present invention is schematically depicted in FIG. 8. Thus, device 10a is shown in pipe 54a. Components of device 10 similar to those of device 10 bear the same numerals, but are succeeded by the letter "a". Device 10a is substantially identical to device 10, except that portions 14a, 16a and 18a of member 12a are without external ribs and have smooth exteriors. Sidewall 74a of portion 18a is thicker than sidewall 76a of portion 14a. So also is sidewall 78a of portion 16a. Connector 32a is identical to connector 32. Valve 42a is identical to valve 42. Device 10a performs substantially similarly to device 10 and has most of the advantages thereof.

Various other modifications, changes, alterations and additions can be made in the improved drain pipe plug device of the present invention, its components and their parameters. All such changes, modifications, alterations and additions as are within the scope of the appended claims form part of the present invention.

What is claimed is:

1. An improved drain pipe plug device, said device comprising, in combination:
   (a) an elongated, elastomeric, hollow, flexible, resilient tubular member defining a generally central passageway extending throughout the length thereof, with exits at opposite ends thereof, said tubular member having a contiguous, bulbous front outlet oprtion, a bulbous, rear inlet portion and a middle portion, said middle portion being of smaller external diameter and more flexible and resilient than said front and rear portions, so as to facilitate insertion of said device through angled connections between dain pipes, said front and rear portions being radially expansible under air and water pressure, to block drain pipes;
   (b) said front outlet portions having a unitary sidewall of a pre-determined thickness for containing said air and water pressure but which allows radial expansion of the external diameter of said front outlet portion at a first rate of expansion,
   (c) said rear inlet portion having a unitary sidewall for containing said air and water pressure, said sidewall of said rear inlet portion having a thickness which is significantly different from said pre-determined thickness of the sidewall of said front outlet portion, said sidewall of said rear inlet portion allowing radial expansion of the external diameter of said rear inlet portion at a rate of expansion which is significantly different from said first rate of expansion, and
   (d) connector means sealingly connected to said rear inlet portion for introduction of a common source of fluid under pressure into said passageway to each of said portions, to radially expand said tubular member to cause it to plug a drain pipe.

2. The improved drain pipe plug device of claim 1 wherein the front of said front outlet portion is tapered to facilitate passage of said device through sewer and drain pipes.

3. The improved drain pipe plug device of claim 1 wherein said front outlet portion and said rear inlet portion are externally ribbed to minimize frictional resistance and reinforce the sidewalls thereof, thereby facilitating passage of said device through drain and sewer pipes, and wherein said middle portion is also radially expansible.

4. The improved drain pipe plug device of claim 3 wherein said middle and front outlet portions have approximately equal sidewall thicknesses and ease of expansibility.

5. The improved drain pipe plug device of claim 4 wherein said front outlet and rear inlet portions are of about equal external diameter when in an unexpanded state.

6. The improved drain pipe plug device of claim 5 wherein said rear inlet portion has a sidewall thickness about 50–80% that of said front outlet portion.

7. The improved drain pipe plug device of claim 1 wherein said connector means comprises at least one of a water line connector and an air hose connector.

8. The improved drain pipe plug device of claim 2 including a relief valve comprising an open elongated tubular cage having an imperforate fluid-blocking transverse wall, said cage being disposed in said tapered part of said front outlet portion, said front outlet portion having an inner sidewall with a transverse groove therein, said trasnverse wall being secured in said transverse groove to block passage of fluid through said passageway untif said tapered portion expands radially sufficiently under pressure to open a pressure-relieving fluid by-pass space between said transverse wall and the inner sidewall of said tapered portion.

9. The improved drain pipe plug device of claim 8 wherein said cage moves rearwardly in said groove during formation of said fluid by-pass space.

10. The improved drain pipe plug device of claim 8 wherein said cage remains essentially stationary in said tapered front outlet portion during formation of said fluid by-pass space.

11. The improved drain pipe plug device of claim 1 wherein said device is dimensioned to expand sufficiently to plug a three inch diameter building clean-out drain with said inlet portion and a four inch diameter main drain with said outlet portion.

12. An improved drain pipe plug device comprising:
   (a) an elongated, flexible, expandible tubular member having a rear inlet member, a front outlet portion and a middle portion,
   (b) said front outlet portion having a unitary sidewall of a pre-determined thickness for containing said air and water pressure but which allows radial expansion of the external diameter of said front outlet portion at a first rate of expansion,
   (c) said rear inlet portion having a unitary sidewall for containing said air and water pressure said sidewall of said rear inlet portion having a thickness which is significantly different from said pre-determined thickness of the sidewall of said front outlet portion, said sidewall of said rear inlet portion expansion of the external diameter of said rear inlet portion at a rate of expansion which is significantly different from said first rate of expansion,
   (d) said inlet portion having a connector means adapted to connect each of the portions of said tubular member to a common source of fluid under pressure.

13. The plug device of claim 12 wherein said outlet portion is tapered to enable easy insertion of the tubular member into and along a drain pipe having a tortuous path.

14. The plug device of claim 12 wherein said second rate of expansion is lower than said first rate of expansion.

15. The plug device of claim 12 wherein said tubular member includes tubb strengthening means disposed on the external surface thereof.

16. The plug device of claim 12 wherein said tubular member includes anti-slip means disposed on the external surface thereof.

17. The plug device of claim 12 wherein the outside diameter of the middle portion of the tubular member is significantly smaller than the outside diameter of both of the inlet and outlet portions.

* * * * *